(12) United States Patent
White

(10) Patent No.: US 10,696,114 B2
(45) Date of Patent: Jun. 30, 2020

(54) UTILITY VEHICLE

(71) Applicant: KUBOTA CORPORATION, Osaka (JP)

(72) Inventor: John White, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 44 days.

(21) Appl. No.: 16/199,726

(22) Filed: Nov. 26, 2018

(65) Prior Publication Data

US 2020/0164706 A1 May 28, 2020

(51) Int. Cl.
*B60G 3/20* (2006.01)
*B62D 21/18* (2006.01)
*B60G 99/00* (2010.01)

(52) U.S. Cl.
CPC .............. *B60G 3/20* (2013.01); *B60G 99/002* (2013.01); *B60G 2200/144* (2013.01); *B60G 2204/143* (2013.01); *B60G 2300/13* (2013.01); *B60Y 2200/124* (2013.01); *B60Y 2200/20* (2013.01); *B62D 21/183* (2013.01)

(58) Field of Classification Search
CPC ................ B60G 3/20; B60G 2200/144; B60G 2204/143; B60Y 2200/20; B62D 21/183
See application file for complete search history.

(56) References Cited

U.S. PATENT DOCUMENTS

| 6,113,144 A * | 9/2000 | Lapic ...................... B60G 7/02 280/124.155 |
| 7,380,805 B1 * | 6/2008 | Turner .................... B60G 3/20 280/124.13 |
| 7,422,082 B2 * | 9/2008 | Reffitt .................... B60G 11/04 180/90.6 |
| 8,454,041 B2 | 6/2013 | Fujii et al. |
| 9,102,205 B2 * | 8/2015 | Kvien ...................... B60G 3/20 |
| 9,650,078 B2 * | 5/2017 | Kinsman .............. B60G 21/055 |
| 10,464,386 B2 * | 11/2019 | Hisada ..................... B60G 3/20 |
| 2007/0214818 A1 | 9/2007 | Nakamura |
| 2019/0275885 A1 * | 9/2019 | Hurd ........................ B62D 49/02 |
| 2019/0276085 A1 * | 9/2019 | Taracko ................. B62D 21/02 |

\* cited by examiner

*Primary Examiner* — Faye M Fleming
(74) *Attorney, Agent, or Firm* — Greenblum & Bernstein, P.L.C

(57) ABSTRACT

A utility vehicle includes a rear frame, a front frame and a coupling body. A height of a vertical section of the front frame is shorter than a height of a vertical section of the rear frame tube, and a ground clearance of an upper face of the front frame tube is shorter than a ground clearance of an upper face of the rear frame. The coupling body connects a rear end of the front frame with a front end of the rear frame. An upper face member of the coupling body includes a forwardly descending sloped face that interconnects an upper face of the rear frame with an upper face of the front frame. A front differential unit is mounted on the front frame. A front drive shaft having a constant velocity joint extends from the front differential unit forwardly of the coupling body and upwardly of the front frame.

6 Claims, 5 Drawing Sheets

UTILITY VEHICLE

TECHNICAL FIELD

The present invention relates to a utility vehicle having front wheels supported to a vehicle body frame to be drivable and steerable.

BACKGROUND ART

In a utility vehicle disclosed in U.S. Pat. No. 8,454,041, to a front frame which is a front end member of left and right main frames constituting a vehicle body, a suspension device is attached via a reinforcing frame. To the front frame and between left and right steering front wheels, there is attached a differential unit to which power from an engine is transmitted. Left and right drive shafts extending to the left and right from the differential unit are coupled respectively to the left and right steering front wheels via knuckle arms. An upper end portion of a shock absorber is coupled to an upper portion of the front frame via a mount and around an intermediate portion of the shock absorber, a coil spring is fitted. To respective leading end portions of an upper arm and a lower arm, the knuckle arms rotatably supporting the steering from wheels are supported to be pivotable about vertical axes. Further, base end portions of the upper arm and the lower arm are supported to a lower portion of the front frame to be pivotable about horizontal axes. Each arm is coupled, via a ball joint attached to its leading end, to the knuckle arm. To the knuckle arm, there is coupled a tie rod of a steering unit for pivotally operating the steering front wheel. The steering unit is configured as a hydraulic cylinder type or a rack-and-pinion type.

In a utility vehicle disclosed in US Publication No. 2007/0214818A1, a base frame which is a major constituent member of a vehicle body is comprised of a pair of left and right side members and a cross member which interconnects the pair of left and right side members. The respective side member comprises a tube having a rectangular cross section and extends in a vehicle body front-rear direction. Front end areas of the pair of left and right side members have a narrowing distance therebetween, thus forming a front frame which supports driving front wheels steerably.

A front frame supporting the steerable driving front wheels mounts a differential unit, and a pair of left and right drive shafts extending from this differential unit extend upwardly of the front frame. The respective drive shaft incorporates a constant velocity joint. Provided the size of the front wheels being fixed, the lower the ground clearance of the differential unit, the smaller the slope angle of the constant velocity joint, thus, the smaller the load applied to the constant velocity joint. Further, the lower the ground clearance of the differential unit, the lower the gravity center of the vehicle body, thus, the better the traveling stability. Moreover, the steering unit for steering the front wheels is disposed adjacent the upper side of the differential unit. Thus, the lower the ground clearance of the differential unit, the larger the space available for mounting the steering unit, so the steering unit can be mounted at an appropriate position.

SUMMARY OF THE INVENTION

An object of the present invention is to provide a utility vehicle having a front frame structure that allows lowering of a ground clearance of a differential unit.

According to the present invention, a utility vehicle comprises a rear frame consisting essentially of a left rear frame tube and a right rear frame tube that extend in a vehicle body front-rear direction, a front frame consisting essentially of a left front frame tube and a right front frame tube that extend in the vehicle body front-rear direction, and a coupling body. A height of a vertical section of the respective front frame tube is shorter than a height of a vertical section of the respective rear frame tube, and a ground clearance of an upper face of the respective front frame tube is shorter than a ground clearance of an upper face of the respective rear frame tube. The coupling body consists essentially of a left coupling bracket that couples a rear end of the left front frame tube with a front end of the left rear frame tube and a right coupling bracket that couples a rear end of the right front frame tube with a front end of the right rear frame tube. An upper face member of the respective coupling bracket includes a forwardly descending sloped face that interconnects an upper face of the respective rear frame tube with an upper face of the respective front frame tube. A front differential unit is disposed between the left front frame tube and the right front frame tube. A left front drive shaft extends, as seen in a plan view, from the front differential unit forwardly of the left coupling bracket and upwardly of the left front frame tube. A right front drive shaft extends, as seen in a plan view, from the front differential unit forwardly of the right coupling bracket and upwardly of the right front frame tube. The left drive shaft and the right drive shaft respectively has a constant velocity joint (CVJ). A left front wheel is steerably driven by the left front drive shaft, and a right front wheel is steerably driven by the right front drive shaft.

With the above-described arrangement, a height of a vertical section of the respective front frame tube constituting the front frame is shorter than a height of a vertical section of the respective rear frame tube constituting the rear frame. As a result, the ground clearance of the upper face of the front frame tube is lower than that of the upper face of the rear frame tube, thus forming a free space upwardly of the upper face of the front frame tube. With utilization of this free space, the pair of left and right drive shafts extending from the front differential unit can be disposed at lower positions than possible with the conventional arrangement. Consequently, the gravity center of the vehicle body is lowered and the traveling stability is improved. Moreover, as the bending angle of the constant velocity joint is made smaller, the durability of this constant velocity joint is improved.

If there is employed an arrangement that a steering rack unit for transmitting a movement of a steering wheel to the front wheel unit is disposed upwardly of the differential unit, disposition of the differential unit at a lower position affords enlargement of a space available for disposition of this steering rack unit, so that the steering rack unit can be disposed at a more appropriate position.

DETAILED DESCRIPTION

Next, an embodiment of a utility vehicle according to the present invention will be explained with reference to the accompanying drawings.

Incidentally, in this detailed description, unless indicated explicitly otherwise, a word "front" means the front (forward) side in a vehicle front-rear direction (traveling direction) and a word "rear" means the rear side with respect to the vehicle front-rear direction (traveling direction). Further, a left-right direction or a transverse direction means a vehicle body transverse direction (vehicle body width direction) perpendicular to the vehicle body front-rear direction. A word "upper" or "lower" designates positional relationship with respect to the perpendicular direction of the vehicle body (vertical direction), indicative of a relationship regarding a ground-clearance height.

Figure 1:
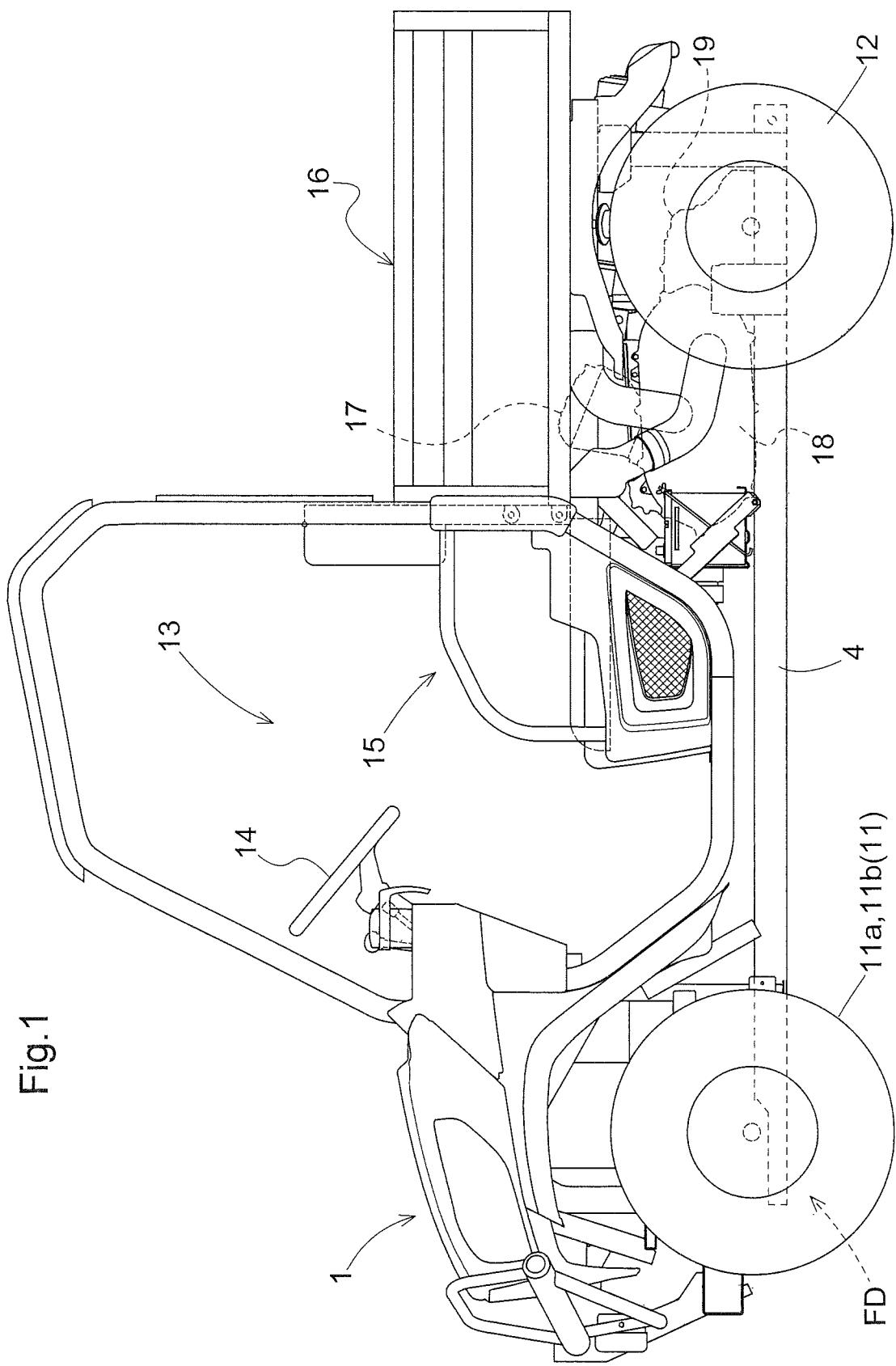
FIG. 1 is a side view showing a utility vehicle in its entirety.

FIG. 1 is a side view showing the utility vehicle. This utility vehicle is a four-wheel drive vehicle having front wheels 11 and rear wheels 12 both configured as drive wheels. The front wheels 11 are steerable, while the rear wheels 12 are not. Incidentally, the term "front wheels 11" is a generic term for a left front wheel 11a and a right front wheel 11b. A vehicle body 1 supported by the front wheels 11 and the rear wheel 12 mounts a maneuvering section 13 and a cargo box 16. The maneuvering section 13 includes a steering wheel 14 and a seat 15. Under the cargo box 16, there are mounted an engine 17, a stepless speed changer device 18 and a transmission 19.

Power of the engine 17 is steplessly speed-changed by the stepless speed changer device 18 and then transmitted therefrom to the transmission 19. Further, power from this transmission 19 is transmitted via a propeller shaft (not shown) extending in the vehicle front-rear direction to a front wheel drive mechanism FD to rotate the front wheels 11.

Figure 2:
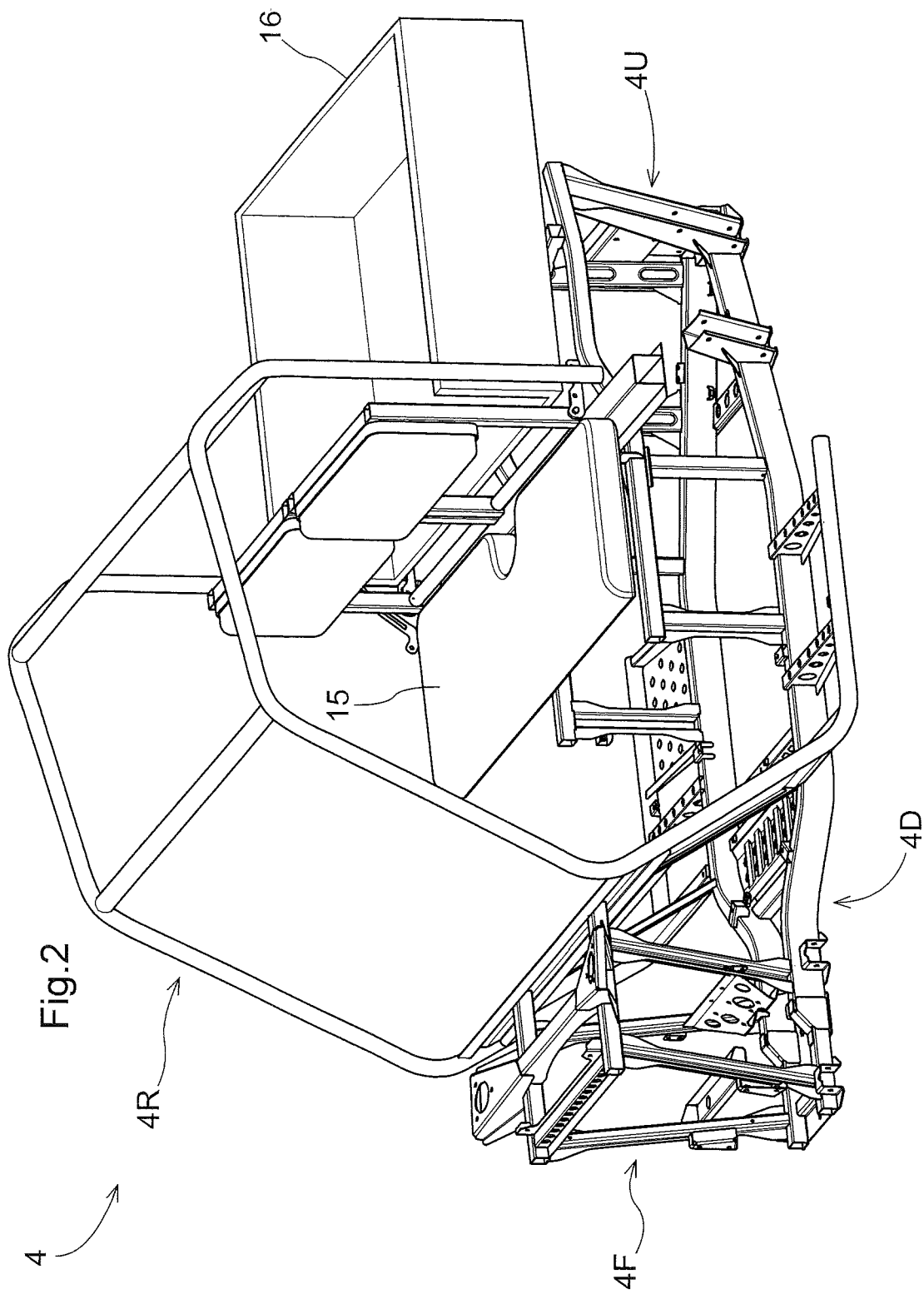
FIG. 2 is a perspective view showing a vehicle body frame structure of the utility vehicle.

FIG. 2 shows a vehicle body frame structure 4 of this utility vehicle. This vehicle body frame structure 4 is composed of steel tube (pipe) members and plate members and consists of an upper structure 4U, a lower structure 4D a front structure 4F, and a ROPS structure 4R. The lower structure 4D constitutes the base of the vehicle body frame structure 4 and extends in the vehicle body front-rear direction. The upper structure 4U is disposed vertically at a rear area of the lower structure 4D and forms a "support deck" for the seat 15, the cargo box 16, etc. The front structure 4F is disposed vertically at front area of the lower structure 4A. The ROPS structure 4R has a greater width than the lower structure 4D and is disposed vertically at a front area of the lower structure 4D.

Figure 3:
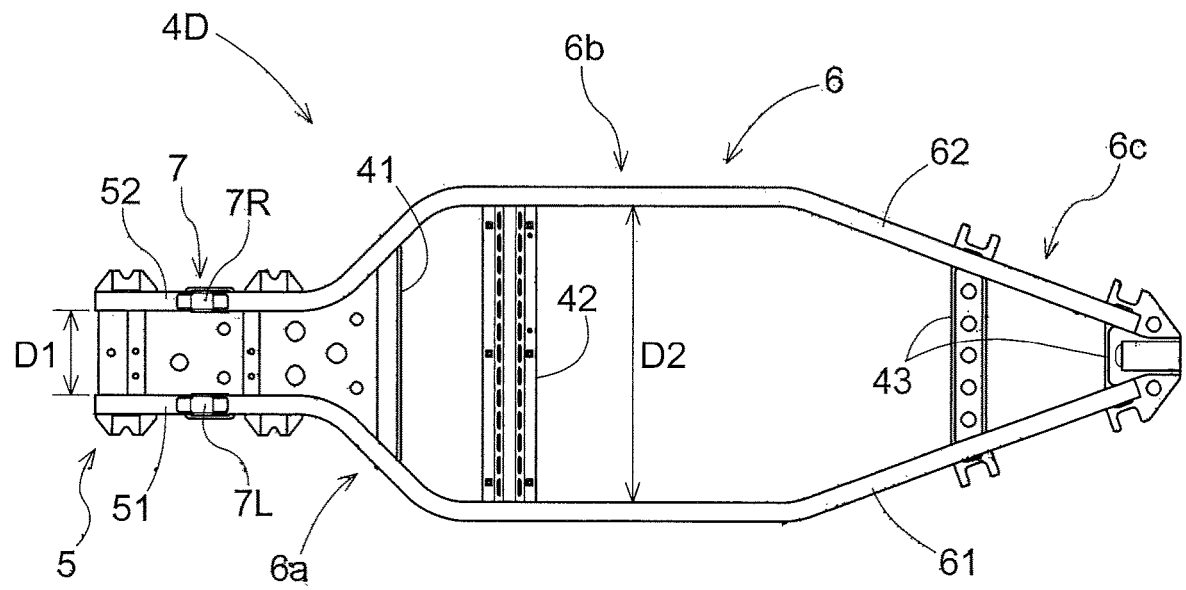
FIG. 3 is a plan view showing a vehicle body frame lower structure.
Figure 4:
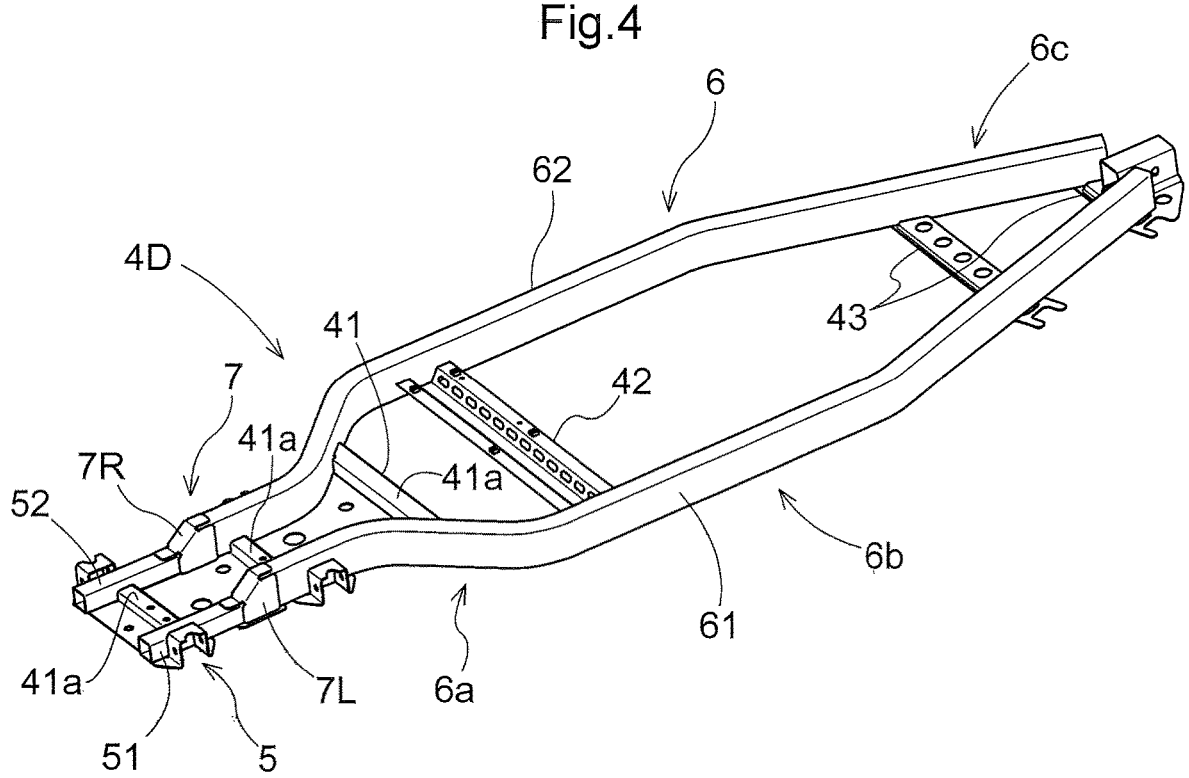
FIG. 4 is a perspective view showing the vehicle body frame lower structure.

As shown in FIG. 3 and FIG. 4, the lower structure 4D consists essentially of a front frame 5, a rear frame 6 and a coupling body 7. The coupling body 7 interconnects a rear end of the front frame 5 with a leading end of the rear frame 6. The rear frame 6 consists essentially of a left rear frame tube 61 and a right rear frame tube 62 that extend in the vehicle body front-rear direction. The vertical section of each one of the left and right rear frame tubes 61, 62 has a rectangular shape whose height is longer than whose width. The front frame 5 consists essentially of a left front frame tube 51 and a right front frame tube 52 that extend in the vehicle body front-rear direction and in parallel with each other with a predetermined distance (denoted by a mark D1 in FIG. 3) therebetween. The vertical section of each one of the left and right front frame tubes 51, 52 has a quadrangle shape defined by one side equal to the short side of the rectangle of the vertical section of the respective left/right frame tube 61, 62 and the other side shorter than the long side of the same rectangle. In this embodiment, the vertical section of each one of the left and right front frame tubes 51, 52 has an approximately square shape.

Further, as cross beams that bridge the left front frame tube 51 with the right front frame tube 52 and bridge the left rear frame tube 61 with the right rear frame tube 62, there are provided a front cross member 41, an intermediate cross member 42 and a rear cross member 43.

The front frame tubes 51, 52 and the rear frame tubes 61, 62 are coupled with each other by the coupling body 7 in such a manner that bottom faces of the front frame tubes 51, 52 and bottom faces of the rear frame tubes 61, 62 are formed flush with each other. Since the height of the vertical section of the front frame tubes 51, 52 is shorter than the height of the vertical section of the rear frame tubes 61, 62, the ground clearance of the upper face of the front frame tube is lower than the ground clearance of the upper face of the rear frame tube.

The rear frame 6 consisting of the left rear frame tube 61 and the left frame tube 62 is sectioned into a front area 6a, an intermediate area 6b and a rear area 6c which respectively have irregular or unique shapes as seen in the plan view. In the intermediate area 6b, the rear frame tubes 61, 62 extend along the vehicle body front-rear direction in parallel with each other with a predetermined gap (denoted by D2 in FIG. 3 and FIG. 4) therebetween. The rear area 6c is positioned rearwardly of the intermediate area 6b. And, in this rear area 6c, the rear frame tubes 61, 62 extend rearwards with a progressively reduced width therebetween.

The front area 6a is positioned forwardly of the intermediate area 6b and in this front area 6a, the distance between the rear frame tubes 61, 62 is progressively increased from D1 to D2, thus creating a flared shape as seen in the plan view. This flared shape is designed as a smooth shape formed by combination of a convexly curved tube portion and a concavely curved tube portion, thus suppressing stress concentration.

Figure 5:
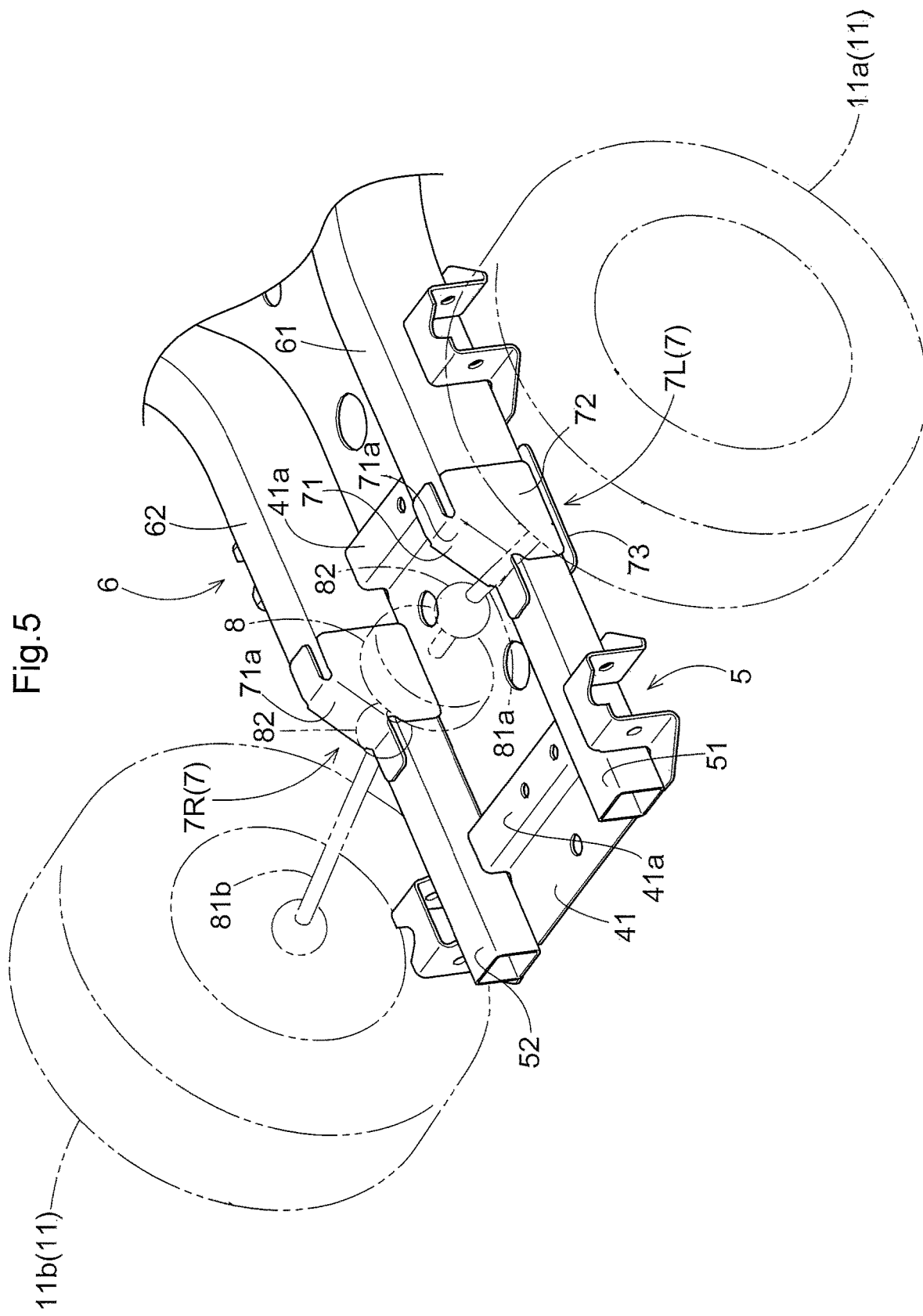
FIG. 5 is a perspective view showing a front frame, a coupling body and a rear frame of a vehicle body.

As shown in FIG. 5 in enlargement, the coupling body 7 coupling the front frame 5 with the rear frame 6 consists of a left coupling bracket 7L and a right coupling bracket 7R. The left coupling bracket 7L fits, like a tubular member, over the rear end of the left front frame tube 51 and the front end of the left rear frame tube 61, thus coupling these ends to each other. The right coupling bracket 7R fits, like a tubular member, over the rear end of the right front frame tube 52 and the front end of the right rear frame tube 62, thus coupling these ends with each other. The left coupling bracket 7L and the right coupling bracket 7R have substantially same shape and size.

Each of the left and right coupling bracket 7L, 7R consists of an upper face member 71, two side face members 72 and a lower face member 73. The upper face member 71 is a flat plate which connects the upper face of the leading end of the rear frame tube 61, 62 with the upper face of the rear end of the front frame tube 51, 52 in flush abutment with each other. The upper face member 71 has a forwardly descending sloped face 71a so as to smoothly absorb the height difference between the upper face of the rear frame tube 61, 62 and the upper face of the font frame tube 51, 52. The side face members 72 are flat plates that connect inner and outer side faces of the leading end portion of the rear frame tube 61, 62 with inner and outer side faces of the leading end portion of the front frame tube 51, 52 in flush abutment with each other. Incidentally, in this embodiment, as may be apparent from FIG. 5 illustration, the upper face member 71 and the two side face members 72 are formed integrally by bending of a single plate.

The lower face member 73 is a flat plate which connects the lower face of the leading end of the left/right rear frame tube 61, 62 with the lower face of the rear end of the left/right front frame tube 51, 52 in flush abutment with each other. In this embodiment, as may be apparent from FIG. 5 illustration, the front cross member 41 is a plate member installed in such a manner as to close the bottom face of the front frame 5 and the bottom face of the front half portion of the rear frame 6. Further, in this front cross member 41, there are formed, by bending works, three protruding cross ribs 41a that extend in the vehicle body transverse direction (see FIG. 4) Needless to say, the front cross member 41 can be replaced at least partially by a cross beam made of a tube or a bar member.

A front differential unit 8 shown by one-dot chain lines in FIG. 5 is disposed between the left front frame tube 51 and the right front frame tube 52. A left front drive shaft 81a for driving the left front wheel 11a extends from the front differential unit 8 forwardly of the left coupling bracket 7L as seen in the plan view and upwardly of the left front frame tube 51. A right front drive shaft 81b for driving the right front wheel 11b extends from the front differential unit 8 forwardly of the right coupling bracket 7R as seen in the plan view and upwardly of the right front frame tube 51. The left front drive shaft 81a and the right front drive shaft 81b respectively has a constant velocity joint (CVJ) 82.

Figure 6:
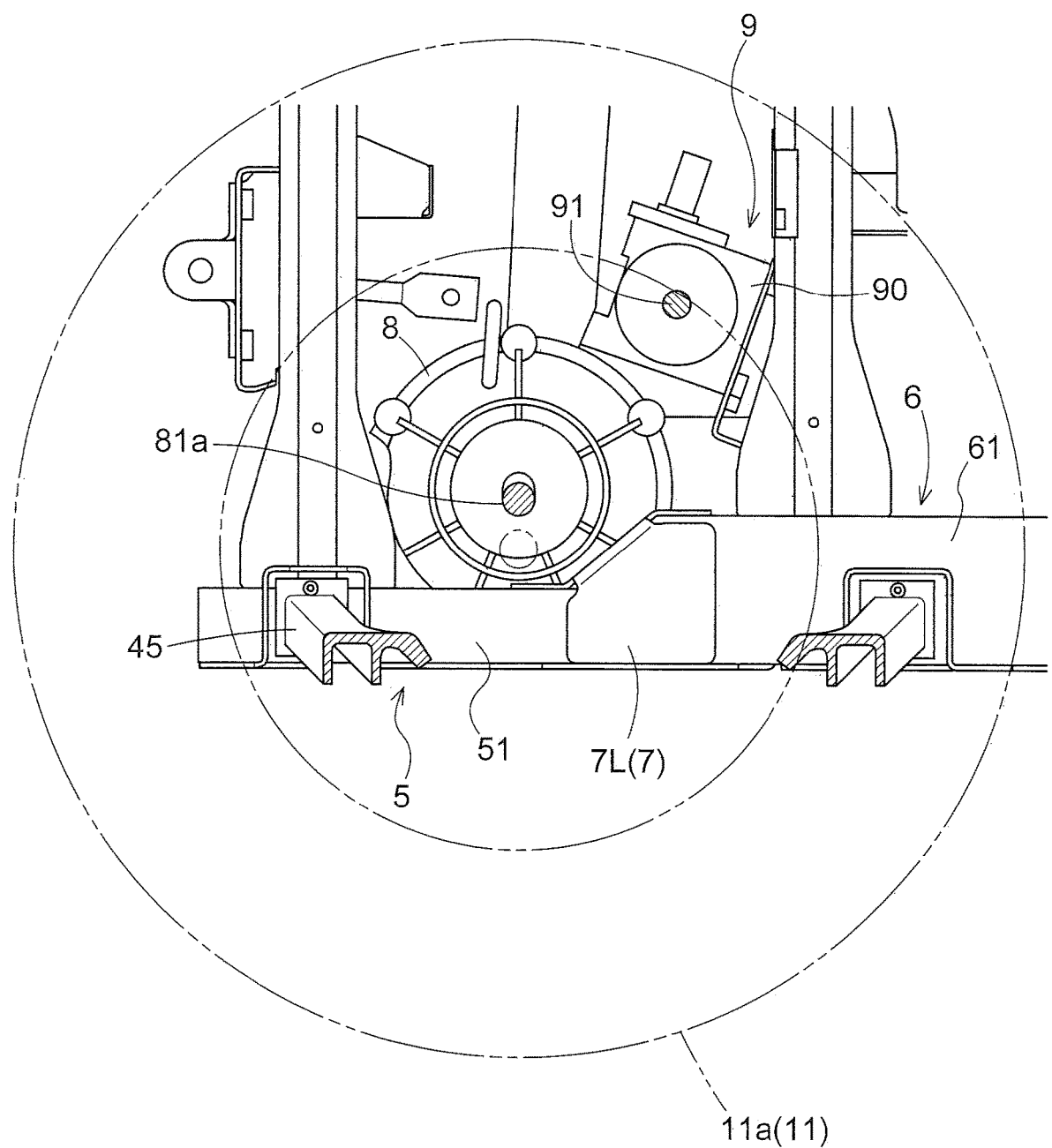
FIG. 6 is a side view showing the vehicle body structure and a front structure.

FIG. 6 shows the front differential unit 8 and the left front drive shaft 81a. In FIG. 6, the left front drive shaft 81a, though being shown cut away in the middle thereof for greater readiness of viewing, extends to be progressively closer to the upper face of the left front frame tube 51 and reaches the left front wheel 11a. The ground clearance of the center of axle of the left front wheel 11a is substantially equal to the ground clearance of the left front frame tube 51. This arrangement provides a smaller bending angle of the constant velocity joint 82. This is an advantage or benefit obtained by the arrangement of the section height of the left front frame tube 51 being shorter than the section height of the right rear frame tube 61. This similarly applies to the right front drive shaft 81b.

FIG. 6 further shows a steering rack unit 9 for maneuvering the left front wheel 11a and the right front wheel 11b The steering rack unit 9 includes a steering rack 90 and a tie rod 91 extending from the opposed sides of the steering rack 90. The steering rack 90 is disposed upwardly and rearwardly of the front differential unit 8 and in close vicinity of this front differential unit 8. A suspension arm 45 for supporting the front wheel 11 is attached between the front frame 5 and the rear frame 6.

In the foregoing embodiment, the front frame 5 and the rear frame 6 respectively is formed of tubes having quadrangular cross section. The front frame 5 and/or the rear frame 6 can be formed of a tube having any other polygonal cross section or a round cross section or can even be made at least partially of not a tube, but of a solid member.

Incidentally, it is understood that the arrangements disclosed in the foregoing embodiment (also in the further embodiments) can be used in any combination with the arrangements disclosed in the other embodiments unless any contraction results from such combinations. Further, it should be understood that the embodiments disclosed in this are only exemplary and the scope of the invention is not limited thereto. Various modifications thereof are possible within a scope not departing from the essence of the present invention.

The invention claimed is:

1. A vehicle comprising:
   a rear frame consisting essentially of a left rear frame tube and a right rear frame tube that extend in a vehicle body front-rear direction;
   a front frame consisting essentially of a left front frame tube and a right front frame tube that extend in the vehicle body front-rear direction, a height of a vertical section of the respective front frame tube being shorter than a height of a vertical section of the respective rear frame tube, a ground clearance of an upper face of the respective front frame tube being shorter than a ground clearance of an upper face of the respective rear frame tube;
   a coupling body consisting essentially of a left coupling bracket that couples a rear end of the left front frame tube with a front end of the left rear frame tube and a right coupling bracket that couples a rear end of the right front frame tube with a front end of the right rear frame tube;
   an upper face member of the respective coupling bracket including a forwardly descending sloped face that interconnects an upper face of the respective rear frame tube with an upper face of the respective front frame tube;
   a front differential unit disposed between the left front frame tube and the right front frame tube;
   a left front drive shaft that extends, as seen in a plan view, from the front differential unit forwardly of the left coupling bracket and upwardly of the left front frame tube, the left front drive shaft having a constant velocity joint;
   a right front drive shaft that extends, as seen in a plan view, from the front differential unit forwardly of the right coupling bracket and upwardly of the right front frame tube, the right front drive shaft having a constant velocity joint;
   a left front wheel steerably driven by the left front drive shaft; and
   a right front wheel steerably driven by the right front drive shaft.

2. The vehicle of claim 1, wherein:
   the vertical section of the respective rear frame tube has a shape of rectangle whose height is longer than whose width as seen in a front view; and
   the vertical section of the respective front frame tube has a shape of quadrangle whose one side is equal to the short side of the rectangle and whose other side is shorter than the long side of the rectangle, as seen in a front view.

3. The vehicle of claim 1, wherein a lower face member of the coupling bracket comprises a planar plate which connects a lower face of the respective rear frame tube and a lower face of the respective front frame tube in flush with each other.

4. The vehicle of claim 1, wherein;
   the rear frame is sectioned into a front area, an intermediate area and a rear area; and
   the front area increases in its width rearwards from a width corresponding to a rear end portion of the front frame, thus transitioning into the intermediate area.

5. The vehicle of claim 1, wherein a steering rack unit for steering the left and right front wheels is disposed upwardly and rearwardly of the front differential unit and in close vicinity of the front differential unit.

6. The utility vehicle of claim 1, wherein the front area of the rear frame has a flared shape formed by combining a convex curve and a concave curve.

\* \* \* \* \*